(12) United States Patent
Okada et al.

(10) Patent No.: US 6,644,021 B2
(45) Date of Patent: Nov. 11, 2003

(54) EXHAUST GAS PURIFYING APPARATUS OF INTERNAL COMBUSTION ENGINE

(75) Inventors: Kojiro Okada, Nagoya (JP); Yasuki Tamura, Nisshin (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/303,605

(22) Filed: Nov. 25, 2002

(65) Prior Publication Data

US 2003/0106307 A1 Jun. 12, 2003

Related U.S. Application Data

(63) Continuation of application No. 09/602,961, filed on Jun. 23, 2000, now abandoned.

(30) Foreign Application Priority Data

Jul. 2, 1999 (JP) .......................... 11-189304
Jul. 2, 1999 (JP) .......................... 11-189307

(51) Int. Cl.[7] ................................. F01N 3/00
(52) U.S. Cl. ..................... 60/286; 60/285; 60/295; 60/300
(58) Field of Search .................. 60/274, 276, 277, 60/285, 286, 295, 300

(56) References Cited

U.S. PATENT DOCUMENTS

| 5,402,641 | A | | 4/1995 | Katoh et al. ............... 60/285 |
|---|---|---|---|---|
| 5,771,685 | A | * | 6/1998 | Hepburn ..................... 60/274 |
| 5,832,722 | A | | 11/1998 | Cullen et al. ............... 60/274 |
| 5,850,735 | A | | 12/1998 | Araki et al. ................ 60/274 |
| 5,974,788 | A | | 11/1999 | Hepburn et al. ............. 60/274 |
| 5,983,627 | A | | 11/1999 | Asik ......................... 60/274 |
| 6,053,154 | A | | 4/2000 | Pott ....................... 123/568.11 |
| 6,058,700 | A | | 5/2000 | Yamashita et al. ........... 60/285 |
| 6,145,303 | A | | 11/2000 | Strehlau et al. ............. 60/274 |
| 6,199,372 | B1 | | 3/2001 | Wakamoto ................. 60/274 |
| 6,205,773 | B1 | | 3/2001 | Suzuki ..................... 60/276 |
| 6,318,075 | B1 | * | 11/2001 | Günther et al. ............. 60/295 |
| 6,327,849 | B1 | * | 12/2001 | Sugiura et al. .............. 60/285 |
| 6,484,493 | B2 | * | 11/2002 | Takanohashi ................ 60/285 |

FOREIGN PATENT DOCUMENTS

| EP | 0 580 389 A | 1/1994 |
|---|---|---|
| EP | 0 892 158 A | 1/1999 |
| EP | 1 087 114 A1 | 3/2001 |

OTHER PUBLICATIONS

"Development of Advanced Emission–Control Technologies for Gasoline Direct–Injection Engines"; Tamura et al.; 2001 Society of Automotive Engineers, Inc. 2001–01–0254.

* cited by examiner

*Primary Examiner*—Thomas Denion
*Assistant Examiner*—Tu M. Nguyen
(74) *Attorney, Agent, or Firm*—Rossi & Associates

(57) ABSTRACT

In an exhaust gas purifying apparatus of an internal combustion engine, the temperature of occlusion-type NOx catalyst is increased to emit SOx when the temperature of occlusion-type NOx catalyst is not less than a set temperature. This prevents the deterioration of fuel consumption and enables the regeneration of a catalyst device by efficiently desorbing a sulfur component from the catalyst device. In this case, the temperature of the occlusion-type NOx catalyst is preferably set according to the frequency of the SOx desorption, and the temperature of the occlusion-type NOx catalyst can be increased by, for example, retarding an ignition timing.

12 Claims, 7 Drawing Sheets

EXHAUST GAS PURIFYING APPARATUS OF INTERNAL COMBUSTION ENGINE

This is a Continuation of application Ser. No. 09/602.961 filed Jun. 23, 2000 abandoned.

BACKGROUND OF THE INVENTION

1. Field of the Invention

The present invention relates to an exhaust gas purifying apparatus of an internal combustion engine, which has an occlusion-type NOx catalyst in an exhaust passage.

2. Description of Related Art

In recent years, a lean combustion internal combustion engine, which is run at a lean air-fuel ratio to improve fuel consumption, has been put to practical use. When this combustion internal combustion engine is run at the lean air-fuel ratio, a three-way catalyst cannot satisfactorily purify NOx (nitrogen oxide) in exhaust gas of the engine due to purifying characteristics thereof. Recently, an occlusion-type NOx catalyst has been developed that occludes NOx in the exhaust gas when the combustion engine is run at the lean air-fuel ratio, and emits and reduces the occluded NOx while the internal combustion engine is run at a stoichiometrical or rich air-fuel ratio.

This occlusion-type NOx catalyst has the characteristics of occluding NOx in the exhaust gas as nitrate ($X-NO_3$) with oxide being excessive in the internal combustion engine, and emitting the occluded NOx with carbon monoxide (CO) being excessive to thereby reduce the NOx to nitrogen ($N_2$) (carbonate ($X-CO_3$) is generated at the same time). Fuel, however, includes a sulfur (S) component, which reacts on oxide to become sulfur oxide (SOx). The occlusion-type NOx catalyst occludes the SOx instead of NOx as sulfate instead of nitrate, and this lowers the purifying efficiency of the catalyst. It has been found that the SOx occluded by the catalyst is purged (S-purge) at a rich air-fuel ratio with the catalyst being maintained at a high temperature. For example, Japanese Patent Provisional Publication No. 7-217474 discloses estimating the amount of SOx occluded by the catalyst, and raising the temperature of the catalyst and temporarily making the air-fuel ratio rich when the amount of the occluded SOx exceeds a permissible amount and the catalyst temperature is lower than a predetermined temperature. This emits the SOx and restores the purifying efficiency of the occlusion-type NOx catalyst.

According to the Japanese Patent Provisional Publication No. 7-217474, however, the SOx is emitted from the occlusion-type NOx catalyst by raising the temperature of the catalyst and making the air-fuel ratio rich regardless of the running conditions of the internal combustion engine on conditions that the amount of the occluded SOx is in excess of a permissible amount and the catalyst temperature is low.

For this reason, if a vehicle is driven in a city area and the like with repeated acceleration and deceleration, the occlusion-type NOx catalyst cannot be easily maintained at a high temperature that is required for emitting the SOx. Therefore, an SOx emission means of the occlusion-type NOx catalyst has to operate for a long time although it cannot sufficiently emit the SOx. More specifically, the temperature of the occlusion-type NOx catalyst is increased even under such a condition that it is difficult to increase the temperature of the occlusion-type NOx catalyst, and thus it is necessary to make the air-fuel ratio rich and increase the temperature of the catalyst for a longer time than in the case where the vehicle is running stably with the catalyst being at a relatively high temperature. Moreover, the temperature of the catalyst must be increased to a large degree. This deteriorates the fuel consumption.

The amount of SOx occluded by the catalyst greatly changes according to a variety of factors such as the catalyst temperature, the air-fuel ratio of the exhaust gas, the concentration of sulfur in the fuel (of different types) and the running conditions of the internal combustion engine. It is therefore difficult to accurately estimate the amount of SOx occluded by the catalyst. If the SOx is emitted from the occlusion-type NOx catalyst according to the estimated amount of SOx occluded by the catalyst as is the case with the Japanese Patent Provisional Publication No. 7-217474, the exhaust gas characteristics may be deteriorated in the case where the estimated amount of SOx occluded by the catalyst cannot be estimated accurately. Moreover, if the amount of the occluded SOx is determined with an estimation error being taken into consideration so as not to deteriorate the exhaust gas characteristics, the SOx is emitted when there is no necessity of emitting the SOx. This deteriorates the fuel consumption.

It is therefore an object of the present invention to provide an exhaust gas purifying apparatus of an internal combustion engine, which enables the stable regeneration of the catalyst device.

SUMMARY OF THE INVENTION

It is therefore an object of the present invention to provide an exhaust gas purifying apparatus of an internal combustion engine, which efficiently desorbs a sulfur component from a catalyst device to thereby prevent the deterioration of the fuel consumption and enable the stable regeneration of the catalyst device.

The above object can be accomplished by providing an exhaust gas purifying apparatus of an internal combustion engine comprising: a catalyst device provided in an exhaust passage of the internal combustion engine, the catalyst device occluding a sulfur component in exhaust gas when an exhaust gas air-fuel ratio is lean at least; and regenerating means for increasing a temperature of the catalyst device to desorb the sulfur component from the catalyst device when the temperature of the catalyst device is not less than a set temperature that is determined within such a range that the occluded sulfur component can be desorbed.

Preferably, the regenerating means includes ignition timing control means for controlling an ignition timing to increase the temperature of catalyst, and air-fuel ratio control means for controlling an air-fuel ratio of the internal combustion engine; and when the temperature of the catalyst device is not less than the set temperature, the ignition timing control means retards the ignition timing and the air-fuel control means changes the air-fuel ratio in such a manner as to achieve an excessive concentration of fuel.

It is possible to provide stop means for stopping the operation of the regeneration means if the temperature of the catalyst device does not reach an optimum catalyst temperature range for desorbing the sulfur component even though a predetermined period of time passes after the operation of the regeneration means.

It is also preferable to provide frequency estimating means for estimating a frequency at which the occluded sulfur component is brought into the state of being emitted; and operation control means for controlling an operation of the regeneration means according to an output of the frequency estimating means.

In this case, the frequency estimating means preferably has desorption frequency sensing means for calculating the frequency according to a regeneration period and a running distance of the catalyst device at a specific catalyst temperature at which the sulfur component can be desorbed.

Moreover, the operation control means preferably operates the regeneration means if an output of the frequency estimating means is small and the unoperated state of the regeneration means continues for a predetermined period of time. It is possible to provide set temperature changing means for changing the set temperature according to the output of the frequency estimating means. In this case, the set temperature changing means preferably increases the set temperature as the frequency increases or has a sensor disposed in the exhaust passage in order to sense an exhaust gas temperature, and the operation control means preferably operates the regeneration means when the temperature of the catalyst device, which is estimated from an output of the sensor, exceeds the set temperature.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A preferred embodiment of the present invention will be described hereinbelow.

Figure 1:
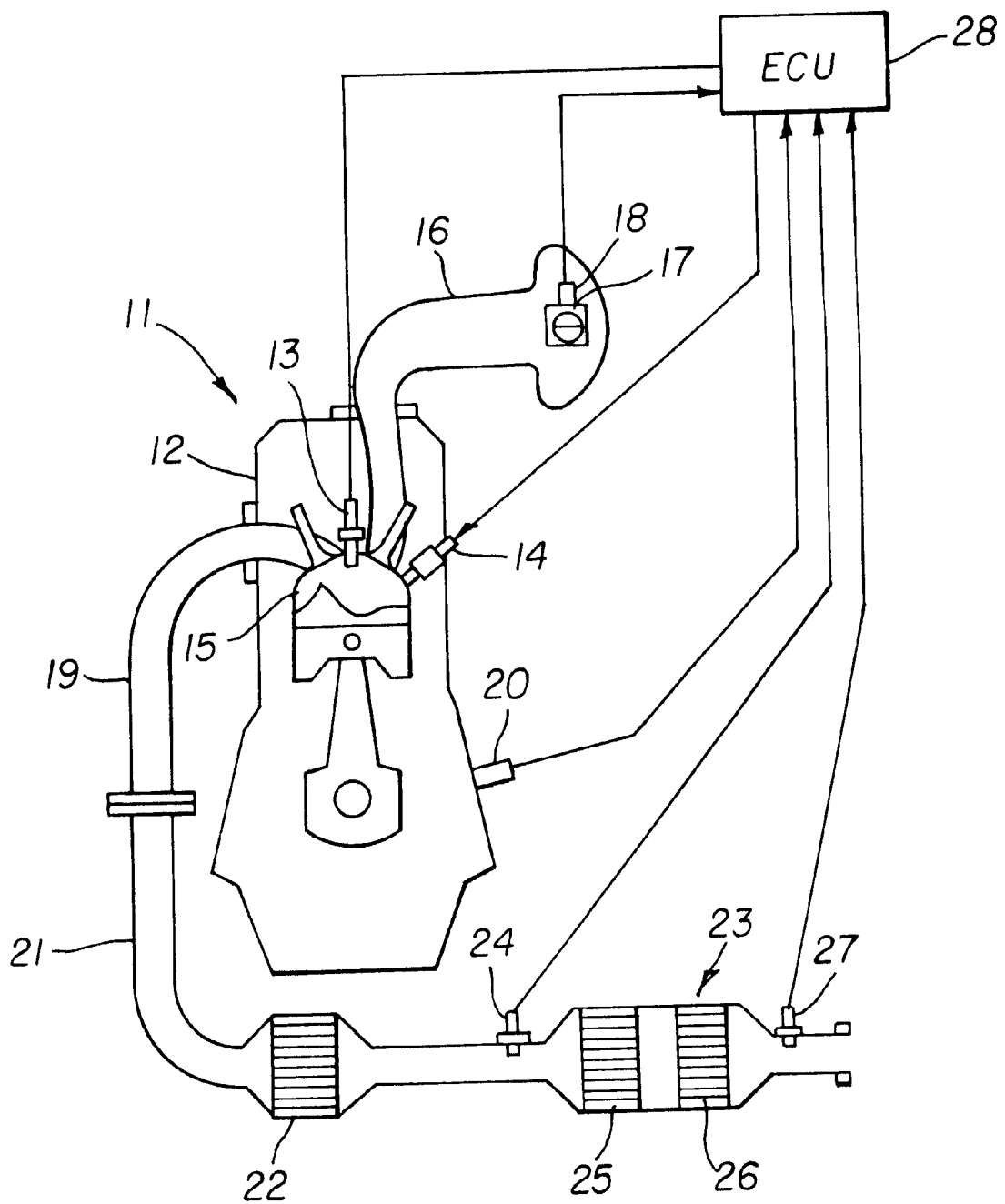
FIG. 1 is a schematic drawing showing the structure of an exhaust gas purifying apparatus of an internal combustion engine according to an embodiment of the present invention.
Figure 2:
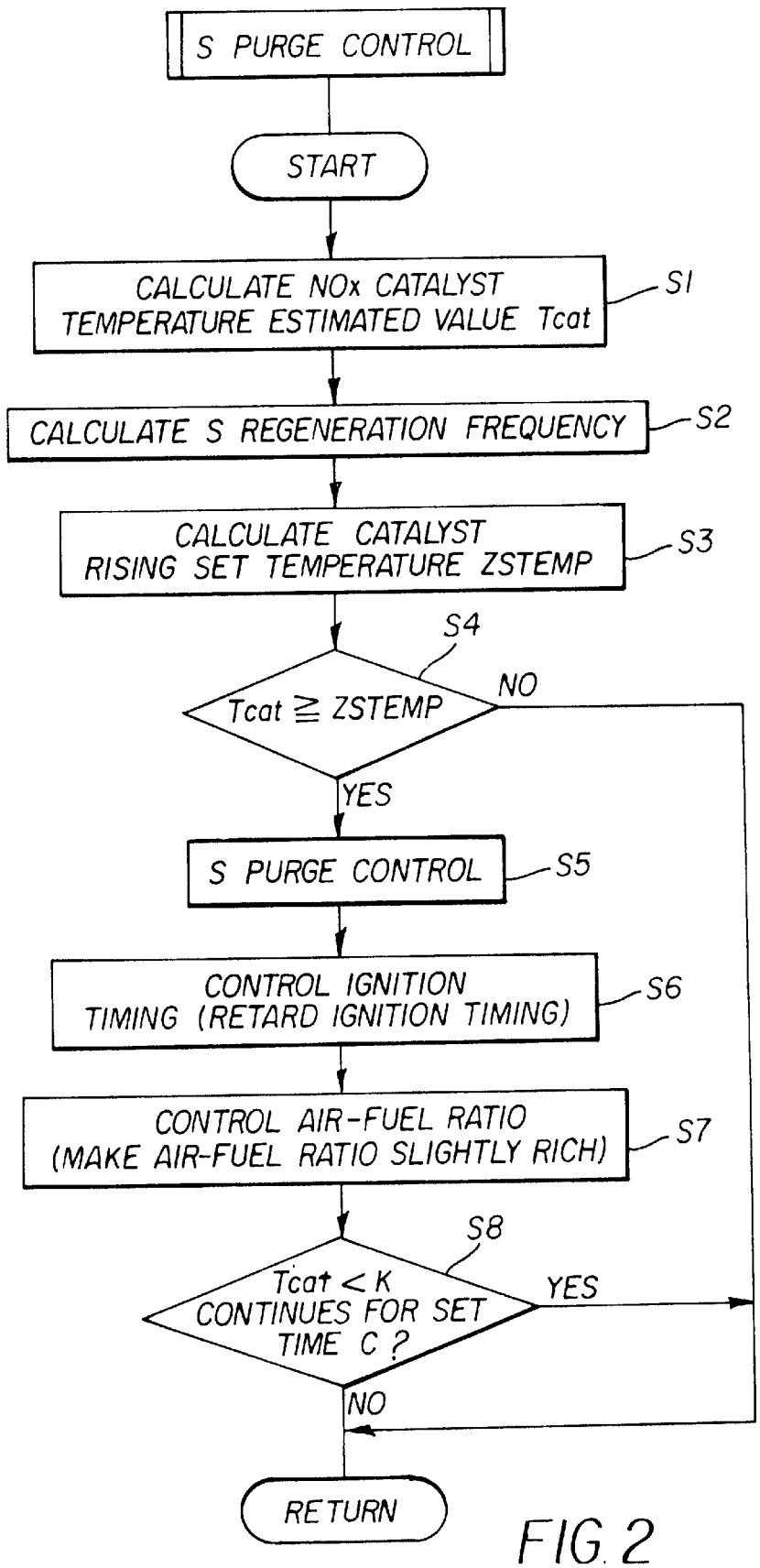
FIG. 2 is a flow chart showing an S purge control of the exhaust gas purifying apparatus according to the embodiment of the present invention.
Figure 3:
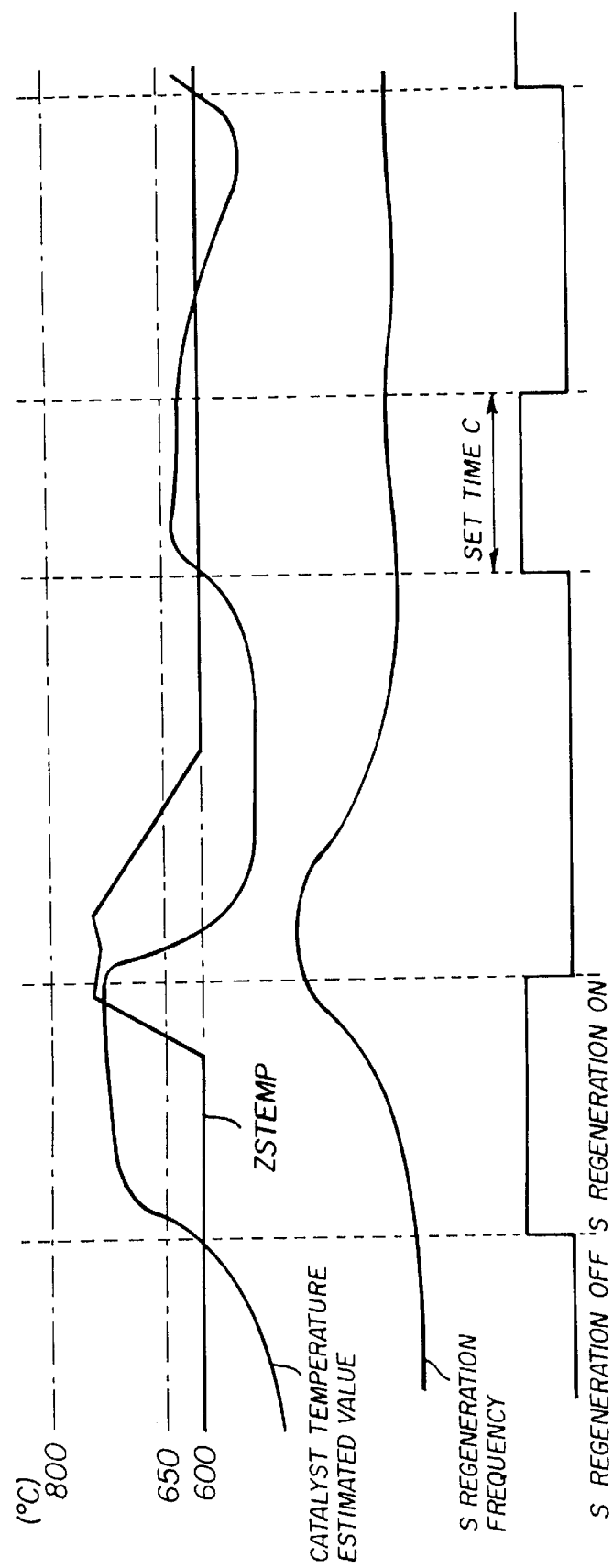
FIG. 3 is a time chart showing the S purge control.
Figure 4:
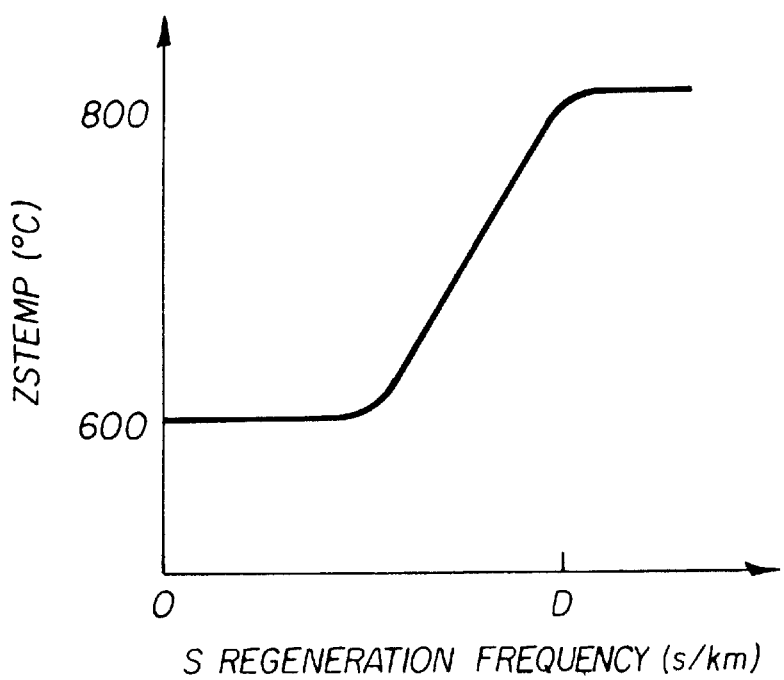
FIG. 4 is a graph showing a set rising temperature with respect to an S regeneration frequency.
Figure 5:
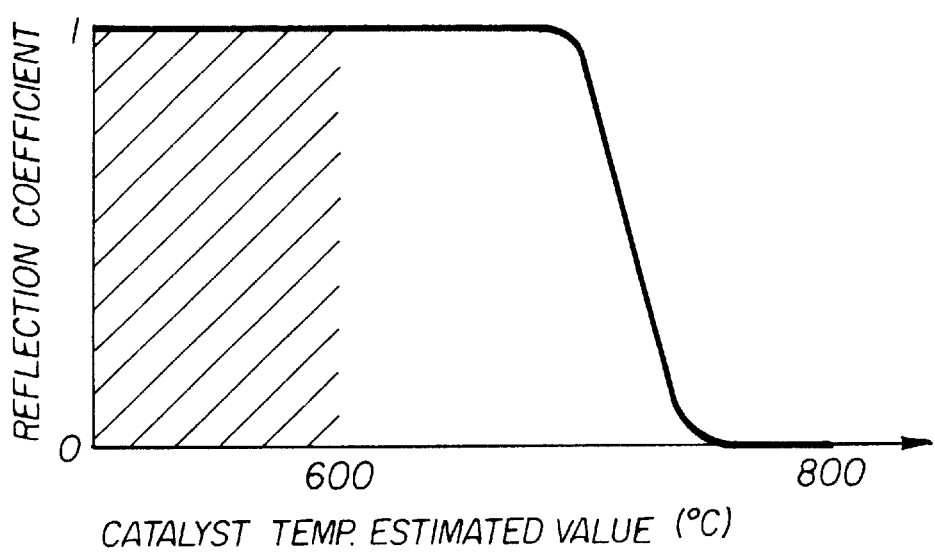
FIG. 5 is a graph showing a reflection coefficient with respect to an estimated value of a catalyst temperature.
Figure 6:
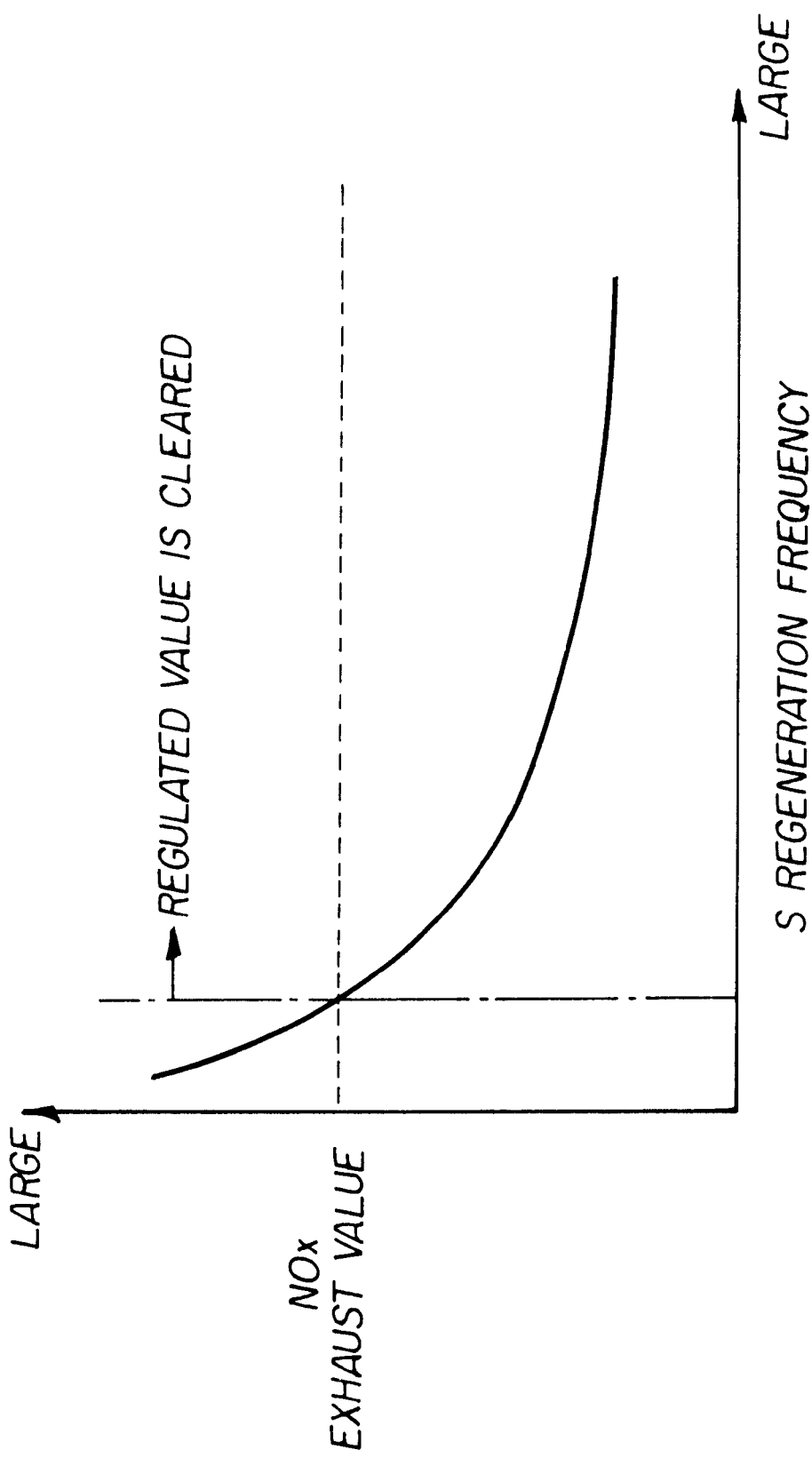
FIG. 6 is a graph showing a relationship between an S regeneration frequency and an NOx emission value.
Figure 7:
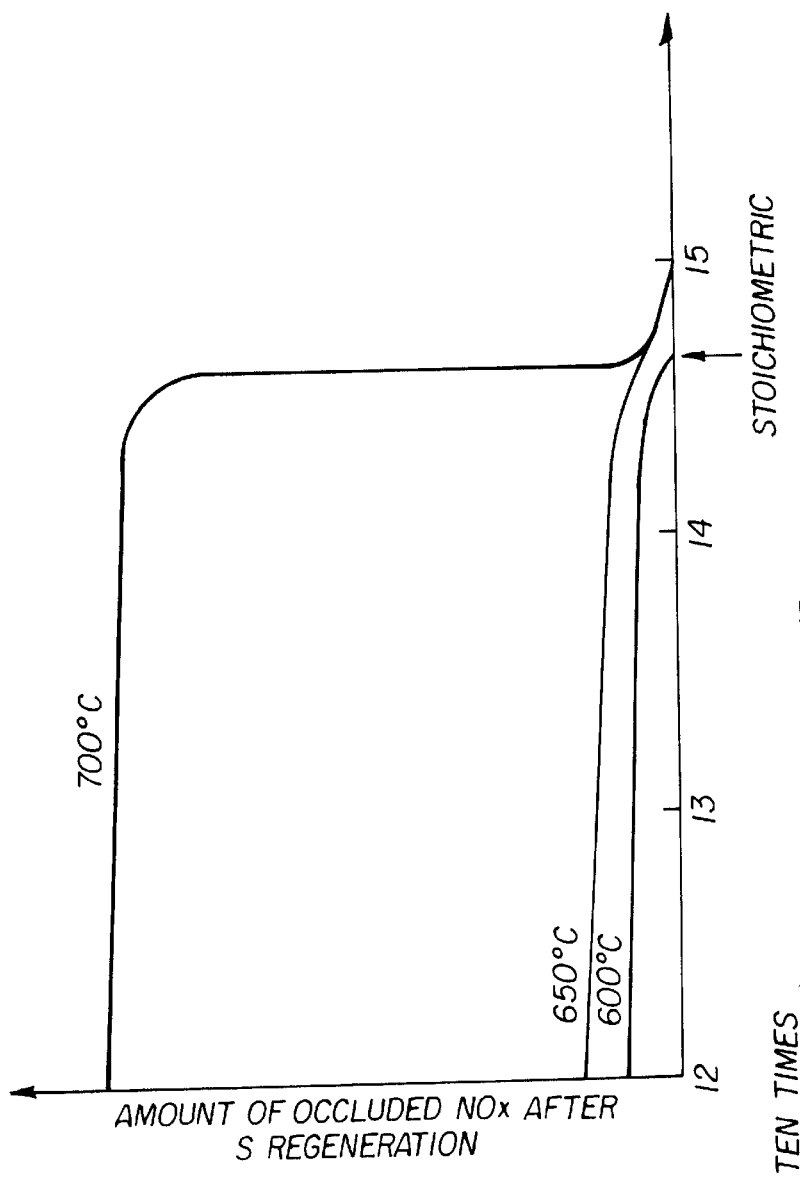
FIG. 7 is a graph showing the amount of NOx occluded by NOx occlusion catalyst that is restored after an S regeneration with respect to an S regeneration A/F.
Figure 8:
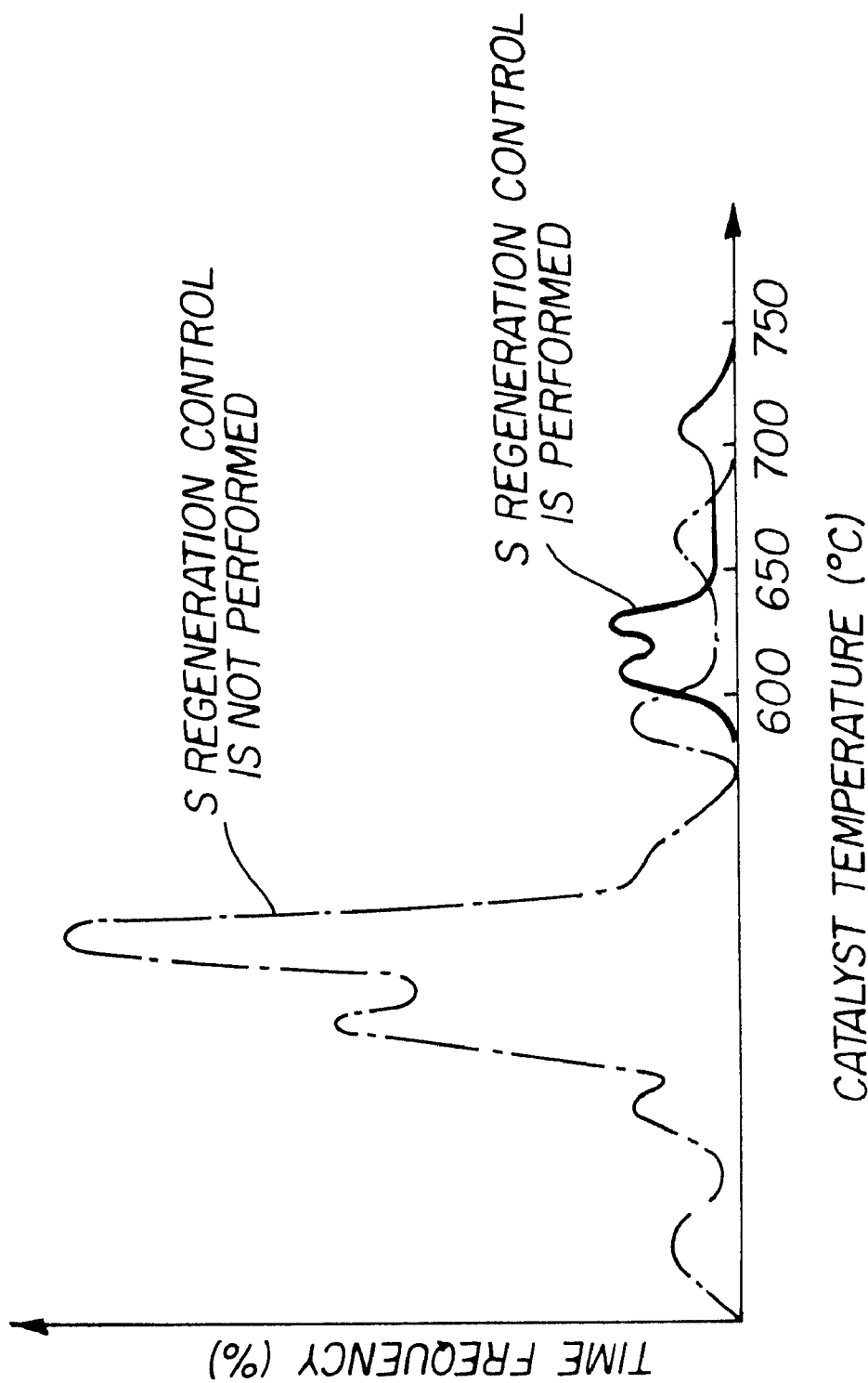
FIG. 8 is a graph showing a time frequency of the catalyst temperature in the case where the embodiment is used or is not used in an ordinary driving.

FIG. 1 is a schematic drawing showing the structure of an exhaust gas purifying apparatus of an internal combustion engine according to an embodiment of the present invention; FIG. 2 is a flow chart showing an S purge control of the exhaust gas purifying apparatus according to this embodiment; FIG. 3 is a time chart showing the S purge control; FIG. 4 is a graph showing a set rising temperature with respect to an S regeneration frequency; FIG. 5 is a graph showing a reflection coefficient with respect to an estimated value of a catalyst temperature; FIG. 6 is a graph showing a relationship between an S regeneration frequency and an NOx emission value; FIG. 7 is a graph showing the amount of NOx occluded by NOx occlusion catalyst that is restored after an S regeneration with respect to an S regeneration A/F; and FIG. 8 is a graph showing a time frequency of the catalyst temperature in the case where the embodiment is used or is not used in an ordinary driving of a vehicle.

The internal combustion engine (hereinafter referred to as an engine) of this embodiment is a cylinder fuel injection type spark ignition serial four cylinder gasoline engine, which is capable of injecting fuel in an suction process (suction process injection mode) or in a compressing process (a compressing process injection mode) by changing fuel injection modes (driving modes). This cylinder fuel injection type engine 11 can easily be driven at a lean air-fuel ratio as well as a theoretical air-fuel ratio (stoichiometrical ratio) and a rich air-fuel ratio. Particularly in the compression process injection mode, the cylinder fuel injection type engine 11 can be driven at a super lean air-fuel ratio.

In this embodiment, an ignition plug 13 and an electromagnetic fuel injection valve 14 are attached to a cylinder head 12 of each cylinder in the engine 11. This fuel injection valve 14 enables fuel to be injected directly into a combustion chamber 15. The fuel injection valve 14 connects to a fuel supply apparatus (a fuel pump) through a fuel pipe (not shown), and the fuel pump contains a fuel tank. Fuel in the fuel tank is supplied to the fuel injection valve 14 at a high fuel pressure, and is injected from the fuel injection valve 14 into the fuel chamber 15 at a desired fuel pressure. In this case, the amount of fuel to be injected is determined according to a fuel discharge pressure of the fuel pump and an opening period (a fuel injection period) of the fuel injection valve 14.

A suction port is formed in substantially a perpendicular direction in the cylinder head 12 of each cylinder, and one end of a suction manifold 16 is connected to each suction port. A drive-by-wire (DBW) electrical throttle valve 17 connects to the other end of the suction manifold 16. The throttle valve 17 is provided with a throttle sensor 18, which senses a throttle opening θth. An exhaust port is formed in substantially the horizontal direction in the cylinder head 12, and one end of an exhaust manifold 19 is connected to the exhaust port is connected to cylinder head 12 in such a manner as to connect with each exhaust port.

The engine 11 is provided with a crank angle sensor 20 for sensing a crank angle. The crank angle sensor 20 is able to sense an engine rotating speed Ne. The cylinder fuel injection type engine 11 is well known, and thus, the structure thereof will not be described in detail.

An exhaust pipe (an exhaust channel) 21 connects to the exhaust manifold 19 of the engine 11. The exhaust pipe 21 connects to a muffler (not shown) through a small three-way catalyst 22 and an exhaust gas purifying catalyst device 23, which are disposed in proximity to the engine 11. A high temperature sensor for sensing an exhaust gas temperature is provided at the top of the upstream of the exhaust gas purifying catalyst device 23, i.e., at the top of the upstream of later-described occlusion-type NOx catalyst 25 in an area between the small three-way catalyst 22 and the exhaust gas purifying catalyst device 23 in the exhaust pipe 21.

The exhaust gas purifying catalyst device 23 is comprised of the following two catalysts: the occlusion-type NOx catalyst 25 and three-way catalyst 26. The three-way catalyst 26 is closer to the downstream than the occlusion-type NOx catalyst 25. If the occlusion-type NOx catalyst 25 sufficiently functions as three-way catalyst, the exhaust gas purifying catalyst device 23 may be comprised only of the occlusion-type NOx catalyst 25. The occlusion-type NOx catalyst 25 occludes the NOx in oxidized atmosphere once, and emits and reduces the NOx to $N_2$ (nitrogen) or the like mainly in reduced atmosphere in which CO exists. More specifically, the occlusion-type NOx catalyst 25 has noble metal such as platinum (Pt) and rhodium (Rh), and has an occluding agent composed of alkali metal and alkali-earth metal such as barium (Ba). An NOx sensor 27 for sensing the concentration of the NOx is provided at the downstream of the exhaust gas purifying device 23.

There is also provided an ECU (electronic control unit) 28, which has a an input/output device, a storage device (e.g., ROM, RAM, non-volatile RAM), a central processing unit (CPU), a timer counter and the like. The ECU 28 totally controls the exhaust gas purifying apparatus of this embodiment including the engine 11. More specifically, an input side of the ECU 28 connects to a variety of sensors such as the high-temperature sensor 24 and the NOx sensor, and receives sensing information from these sensors. On the other hand, an output side of the ECU 28 connects to the ignition plug 13 and the fuel injection valve 14 through an ignition coil. Optimum values of a fuel injection amount, an ignition timing and the like calculated according to the sensing information from the sensors are outputted to the ignition coil, the fuel injection valve 14 and the like. Therefore, the fuel injection valve 14 injects a proper amount of fuel in a proper timing, and the ignition plug 13 ignites in a proper timing.

Actually, the ECU 28 finds a target cylinder inside pressure, i.e. a target average effective pressure Pe with respect to an engine load according to throttle opening information θth from the throttle sensor 18 and engine rotating speed information Ne from the crank angle sensor 20. The ECU also sets the fuel injection mode with reference to a map (not shown) according to the target average effective pressure Pe and the engine rotating speed information Ne. If, for example, the target average effective pressure Pe and the engine rotating speed Ne are low, the compression process injection mode is set as the fuel injection mode so that the fuel can be injected in the compression process. If the target average effective pressure Pe and the engine rotating speed Ne are high, the suction process injection mode is set as the fuel injection mode so that the fuel can be injected in the suction process.

Then, a target air-fuel ratio (a target A/F) is set as a control target from the target average effective pressure Pe and the engine rotating speed Ne, and a proper amount of fuel to be injected is determined according to the target A/F. A catalyst temperature Tcat is estimated from exhaust gas temperature information sensed by the high-temperature sensor 24. More specifically, a temperature difference map is produced by experiments or the like according to the target average effective pressure Pe and the engine rotating speed Ne in order to compensate an error resulting from the arrangement of the high-temperature sensor 24 and the occlusion-type NOx catalyst 25, which are disposed at some distance. The catalyst temperature Tcat is estimated univocally upon determination of the target average effective pressure Pe and the engine rotating speed N.

There will now be explained the operation of the exhaust gas purifying apparatus of the internal combustion engine according to this embodiment that is constructed in this manner. The occlusion-type NOx catalyst 25 of exhaust gas purifying catalyst device 23 generates nitrate from the NOx in the exhaust gas with the oxide being excessive, for example, when the engine is driven by the combustion of super lean gas in a lean mode. Therefore, the occlusion-type NOx catalyst 25 occludes and purifies the exhaust gas. On the other hand, in the three-way catalyst 26, the nitrate occluded into the occlusion-type NOx catalyst 25 reacts on CO in the exhaust gas to generate carbonate, and the NOx is emitted in the atmosphere with a low oxide concentration. As the occlusion of the $NO_x$ into the occlusion-type NOx catalyst 25 proceeds, the oxide concentration is lowered by making the air-fuel ratio rich or additionally injecting fuel to thereby supply the CO into the exhaust gas and emit the NOx from the occlusion-type NOx catalyst 25, thus maintaining the functions.

The sulfur component (SOx) included in the fuel and engine oil also exists in the exhaust gas, and the occlusion-type NOx catalyst 25 occludes the SOx as well as the NO in the atmosphere with an excessive oxide concentration. More specifically, the sulfur component is oxidized into SOx, a part of which reacts with occlusion agent, which is originally used for occluding NOx, on the occlusion-type NOx catalyst 25 to become sulphate, which is occluded by the occlusion-type NOx catalyst 25 instead of the NOx.

The occlusion-type NOx catalyst 25 has a function of emitting the occluded SOx when the oxide concentration is lowered. More specifically, a part of the sulphate occluded into the occlusion-type NOx catalyst 25 reacts on the CO in the exhaust gas to generate the carbonate and the SOx is desorbed in the atmosphere including excessive CO with a low oxide concentration. The sulphate is more stable as salt compared with the nitrate, and only a part of the sulphate is dissolved if the oxide concentration is only lowered in the atmosphere. Thus, the amount of the sulphate residues in the occlusion-type NOx catalyst 25 is increased as time passes. This reduces the occluding capability of the occlusion-type NOx catalyst 25 as time passes, and deteriorates the performance thereof (S poisoning).

In order to restore the NOx occluding capability, the amount of SOx occluded by the occlusion-type NOx catalyst 25 may be estimated in order to estimate the status of the S poisoning, and SOx may be emitted if the S poisoning proceeds to some extent. The amount of the occluded SOx, however, is influenced by a variety of factors such as the catalyst temperature, the exhaust air-fuel ratio, the S concentration of the fuel (of different types) and the engine driving conditions. It is therefore difficult to correctly estimate the amount of the occluded SOx. To address this problem, in this embodiment, the amount of the SOx occluded by the occlusion-type NOx catalyst 25 is estimated. In this embodiment, a regenerating means increases the temperature of the catalyst and makes the air-to-fuel ratio rich to emit the occluded SOx, thus restoring the NOx occluding capability. The regenerating means maintains the degree of regeneration for emitting the SOx from the occlusion-type NOx catalyst 25 within a predetermined range. More specifically, the temperature of the occlusion-type NOx catalyst 25 is increased and the air-to-fuel is made rich to emit the SOx in the case where temperature of the occlusion-type NOx catalyst 25 is higher than an activation temperature (e.g., 250–350° C.) and is not less than a temperature (e.g., 650° C.) suitable for the desorption of the occluded SOx or a lower set temperature (e.g., 600–800° C.). More specifically, a temperature rising means is assistively operated slightly when the catalyst temperature is high to some extent, so that the S regeneration speed can reach the catalyst temperature range. This enables the efficient emission of the SOx while raising the temperature to a small degree (i.e., only deteriorating the fuel consumption to a small degree).

There will now be explained an S purge control with reference to the flow chart of FIG. 2 and the time chart of FIG. 3. First, the catalyst temperature Tcat of the occlusion-type NOx catalyst 25 is estimated from the exhaust gas temperature information sensed by the high-temperature sensor 24 in a step S1 as shown in FIG. 2. In this case, an error between the high-temperature sensor 24 and the actual catalyst temperature is compensated according to the temperature difference map produced according to the target average effective pressure Pe and the engine rotating speed information Ne as described previously.

In a next step S2, an S regeneration frequency representing the regeneration (S regeneration) degree of the occlusion-type NOx catalyst 25 from the S poisoning is calculated (by desorption frequency sensing means). The method of calculating the S regeneration frequency will be described below. The S regeneration frequency is calculated according to the following equation (1):

$$S \text{ regeneration frequency (s/km)} = S \text{ regeneration period at } 700° \text{ C./running distance} \quad (1)$$

The S regeneration period at 700° C. is found by converting the S regeneration period at the estimated catalyst temperature Tcat of the occlusion-type NOx catalyst 25 into the S regeneration period at the catalyst temperature of 700° C. The S regeneration period at 700° C. is divided by the running distance to find the S regeneration period per 1 km of the running distance, in other words, the S regeneration frequency. If the S regeneration frequency is increased, the SOx can be emitted (purged) satisfactorily. This means that the occlusion-type NOx catalyst 25 is satisfactorily regenerated from the S poisoning. The S regeneration period at 700° C. is calculated according to the following equation (2):

$$\text{The } S \text{ regeneration period at } 700° \text{ C. } (n) = \text{The } S \text{ regeneration period at } 700° \text{ C. } (n-1) + S \text{ regeneration speed coefficient} \times \text{calculation cycle} \times \text{A/F coefficient} \quad (2)$$

The S regeneration speed coefficient compensates the variations of the S regeneration speed in accordance with the temperature of the occlusion-type NOx catalyst 25, and converts the S regeneration period at each catalyst temperature into the S regeneration period at 700° C. (n). The S regeneration speed increases exponentially with the increase in the temperature of the occlusion-type NOx catalyst 25. Therefore, the S regeneration speed is 0 when the catalyst temperature Tcat of the occlusion-type NOx catalyst 25 is less than or equal to 580° C. The S regeneration speed coefficient is calculated according to the following equation (3), which is approximated by an exponential function:

$$S \text{ regeneration speed coefficient} = \exp\{-kk \times (1/T1) - (1/T0)\} \quad (3)$$

In the above equation (3), kk represents a predetermined coefficient that is set according to the S regeneration reaction of the occlusion-type NOx catalyst 25; T1 represents the catalyst temperature Tcat (K) of the occlusion-type NOx catalyst 25; and T0 represents 973K, which equals 700° C.+273.

In this embodiment, the ECU 28 does not calculate the S regeneration speed coefficient by the exponential function, but finds the S regeneration speed coefficient from an S regeneration coefficient map of previously calculated values with respect to the catalyst temperature. The A/F coefficient indicates the S regeneration degree according to the A/F. The A/F coefficient is 0 when the air-fuel ratio is in a lean mode or when the fuel is cut, and the A/F coefficient is 1 in the other modes.

The S regeneration frequency is reset at not less than a predetermined value D (e.g., 1.5 s/km) so that the S regeneration period at 700° C. can be 0 s and the running distance can be 0 km. More specifically, if the S regeneration frequency is not less than the predetermined value D, the regeneration of the occlusion-type NOx catalyst 25 is stopped since it is purged sufficiently. The threshold value D for resetting the S regeneration frequency can be designated as follows. As shown in FIG. 6, the amount of the exhausted NOx is decreased as the S regeneration frequency increases, and thus the S regeneration frequency is set so that the amount of the discharged NOx can be not greater than an exhaust regulated value. It has been found that the threshold value D should be set at not less than about 1.5 s/km although it is affected by the catalyst characteristics and the NOx exhaust regulated value.

When the S regeneration frequency is found, a rising set temperature ZSTEMP(° C.) is calculated in a step S3. In this case, a map of ZSTEMP with respect to the S regeneration frequency is produced in advance as shown in FIG. 4. According to the map, ZSTEMP is set at 600° C. when the S regeneration frequency is small, and ZSTEMP rises with the increase in the S regeneration frequency. ZSTEMP is 800° C. at the predetermined value D. More specifically, the rising set temperature ZSTEMP is changed according to the S regeneration frequency (the desorption frequency information of the desorption frequency sensing means) (by set temperature changing means).

Then, it is determined in a step S4 whether the catalyst temperature Tcat of the occlusion-type NOx catalyst 25 is not less than ZSTEMP. If the catalyst temperature Tcat is less than ZSTEMP, the routine is finished without doing anything. On the other hand, if the catalyst temperature Tcat is not less than ZSTEMP, the process goes to a step S5 on the assumption that that the S purge is easy since the S regeneration frequency is small and the temperature of the occlusion-type NOx catalyst 25 is increased to some extent. In the step S5, the control mode is changed an S purge mode (by operation control means). This starts the removal of the SOx occluded by the occlusion-type NOx catalyst 25 (S purge).

In a step S6, the temperature of the occlusion-type NOx catalyst 25 is increased by controlling (retarding) the ignition timing (by ignition timing control means). More specifically, the exhaust gas flowing into the occlusion-type NOx catalyst 25 is sufficiently heated by retarding the ignition timing to thereby quickly increase the temperature of the occlusion-type NOx catalyst 25 to a temperature (e.g., 650–800° C.) suitable for the S purge. In this case, the ignition timing is retarded according to the following equation (4):

$$\text{Ignition timing} = \text{base ignition timing} - \text{ZSSA} \times \text{reflection coefficient} \quad (4)$$

In this equation, ZSSA is set with reference to a retard map produced according to the target average effective pressure Pe and the engine rotating speed information Ne. ZSSA is determined according to a retard amount as a combustion limit with a margin being taken into consideration. As shown in FIG. 5, the reflection coefficient is determined with reference to a map produced according to a catalyst temperature estimated value, i.e., the catalyst temperature Tcat. The reflection coefficient is 0 when the fuel is cut and the throttle opening is not less than a predetermined value.

In a next step S7, the air-fuel ratio is controlled. More specifically, the driving at the lean air-fuel ratio is prohibited, and the driving at a stoichiometrical feedback (F/B) or open-loop rich ratio is only allowed. The air-fuel ratio can be stoichiometrical or rich. FIG. 7 shows a relationship between the S regeneration degree (the amount of NOx occluded by the occlusion-type NOx catalyst 25 restored after the S regeneration) and the air-fuel ratio during the S regeneration (the S regeneration A/F). The S regeneration is performed unless the air-fuel ratio is not lean, in other words, if the air-fuel ratio is stoichiometrical or rich. Thus, the S regeneration degree depends on the air-fuel ratio during the S regeneration to a small degree if the air-fuel ratio is stoichiometrical or rich. The richer the air-fuel ratio is, the more the fuel consumption deteriorates; and the richer the air fuel ratio is, the more $H_2S$ is generated as the cause of odor. For this reason, the air-fuel ratio during the S regeneration is preferably closer to the stoichiometrical ratio. It is, however, preferable to make the air-fuel ratio slightly rich, i.e., between 14 and 14.7 with a control error being allowed for. As is clear from FIG. 7, the S regeneration degree is small if the temperature of the occlusion-type NOx catalyst 25 is 600° C. during the S regeneration, although the regeneration period is ten times as long as in the case where the temperature of the occlusion-type NOx catalyst 25 is 650° C. and 700° C. Thus, the S regeneration degree is greatly affected by the catalyst temperature during the S regeneration.

In a next step S8, after the catalyst temperature Tcat is lower than a predetermined value K (e.g., 650° C.) for a predetermined time C (e.g., 45 sec), the increase in the temperature of the occlusion-type NOx catalyst 25 is stopped and the air-fuel ratio is made lean to finish this routine. More specifically, if the catalyst temperature Tcat does not reach an optimum temperature (e.g., 650° C.) for the desorption of the sulfur component even if the mode is switched to the S purge mode, the S purge mode is stopped in order to prevent the deterioration of the fuel consumption (by stop means). On the other hand, if the catalyst temperature Tcat becomes the predetermined value K or more before the predetermined time C passes, the temperature of the occlusion-type NOx catalyst 25 is increased and the air-fuel ratio is made rich continuously.

The routine of the S purge control is repeated in the S purge mode. When the SOx occluded by the 600° C. is emitted, the S regeneration frequency of the occlusion-type NOx catalyst 25 is increased and ZSTEMP is also increased according to the map in FIG. 4. If ZSTEMP exceeds the catalyst temperature Tcat, the catalyst temperature Tcat of the occlusion-type NOx catalyst 25 becomes lower than ZSTEMP. Then, this routine is finished to stop the S purge mode.

There will now be explained the control for switching the mode to the S purge mode. As shown in FIG. 3, the rising set temperature ZS1TEMP is set at 600° C. when the S purge mode is OFF and the S regeneration frequency is small. The S purge mode is turned on (Yes in the step S4) if the catalyst temperature Tcat is increased to exceed ZSTEMP under some driving conditions, e.g., when the vehicle is accelerated and when the vehicle is running on a highway or a mountain road. Then, the temperature of the occlusion-type NOx catalyst 25 is increased and the air-fuel ratio is made rich by retarding the ignition timing, and therefore, the SOx occluded by occlusion-type NOx catalyst 25 is emitted. The S regeneration proceeds as the S purge mode continues. Accordingly, the S regeneration period at 700° C. and the S regeneration frequency are increased. With the increase in the S regeneration frequency, ZSTEMP is increased according to the map in FIG. 4 to finally exceed the catalyst temperature Tcat.

Then, the S purge mode is turned off (No in the step S4) to stop the increase in the temperature of the occlusion-type NOx catalyst 25, and thus, the catalyst temperature Tcat is lowered. If the running distance is increased at the low catalyst temperature, the S regeneration frequency is reduced and ZSTEMP is lowered to 600° C.

The S purge mode is turned on (Yes in the step S4) if the catalyst temperature Tcat is increased again to exceed ZSTEMP under some driving conditions. If a driver drives a vehicle in a city area or the like while repeating the acceleration and deceleration, the occlusion-type NOx catalyst 25 cannot easily return to a high temperature required for emitting the SOx. More specifically, the catalyst temperature Tcat continues to be lower than 650° C. although it exceeds ZSTEMP (600° C.) at first. The S regeneration cannot be performed efficiently in this temperature range. Therefore, the S purge mode is turned off (No in the step S4) to stop retarding the ignition timing and making the air-fuel ratio rich if catalyst temperature Tcat continues to be lower than 650° C. for the set time C. This prevents the deterioration of the fuel consumption in the temperature range where the S regeneration efficiency is low.

In the S purge mode, the air-fuel ratio is set in the rich air-fuel ratio mode and is prohibited from shifting to the lean air-fuel ratio mode. If the temperature of the occlusion-type NOx catalyst 25 is high, the lean air-fuel ratio mode is sometimes prohibited in advance in order to prevent a heat deterioration of the occlusion-type NOx catalyst 25.

To perform the S purge, the throttle opening 2th is adjusted with respect to the throttle opening by operating the throttle valve 17 according to the retard of the ignition timing in order to control the amount of sucked air. This compensates the decrease in torque caused by the retard of the ignition timing so that the torque can be maintained almost constant. In this case, the throttle opening is determined according to the following equation (5):

$$\text{Throttle opening} = \text{base throttle opening} - \text{ZSETV} \times \text{reflection coefficient} \quad (5)$$

ZSETV is determined with reference to a throttle opening correction map that is produced according to the target average effective pressure Pe and the engine rotating speed information Ne. The reflection coefficient is determined with reference to the map in FIG. 5 as described previously. In this case, the reflection coefficient may be determined with reference to a map of the throttle opening 2th with respect to the corrected ignition timing (the ignition timing after the retard).

According to the present embodiment, the degree of the regeneration for emitting SOx from the occlusion-type NOx catalyst 25 is controlled to be maintained within a predetermined range. More specifically, if the catalyst temperature Tcat of the occlusion-type NOx catalyst 25 is higher than an activating temperature (e.g., 250–350° C.) and is less than a temperature suitable for the desorption of the occluded SOx (650–800° C.) or lower rising set temperature ZSTEMP, the ignition timing is retarded to raise the temperature of the occlusion-type NOx catalyst 25 and the air-fuel ratio is made rich to emit the SOx.

Thus, when the occlusion-type NOx catalyst 25 is at a high temperature to some extent, the temperature thereof is increased assistively to emit and regenerate the SOx in a suitable catalyst temperature range where the S regeneration speed is low and which is suitable for a low SOx emission speed. For this reason, the S regeneration is not forcibly performed in the case where it takes a long time to raise the temperature of the occlusion-type NOx catalyst 25 from a Low temperature to an optimum temperature for the emission of the SOx. This eliminates the necessity of making the air-fuel ratio rich or retarding the ignition timing for a long period, or substantially retarding the ignition timing for rising the temperature from the low temperature by a large degree. This prevents the deterioration of the fuel consumption.

FIG. 8 shows a comparison of time frequency of the catalyst temperature of the occlusion-type NOx catalyst 25 between the case where the S regeneration control by assistively raising the temperature during an ordinary driving according to the present embodiment is performed and the case where such an S regeneration control is not performed. By the S purge control according to the present embodiment, the time frequency is substantially increased when the S regeneration speed is greater than or equal to 650° C., which is suitable for the S regeneration. The time frequency is also increased when the S regeneration speed is greater than or equal to 700° C. This means that the S regeneration can be performed efficiently.

Moreover, if the catalyst temperature Tcat does not reach the optimum temperature (e.g., not less than 650° C.) for the desorption of the sulfur component in the S purge mode, the S purge mode is stopped after the set time C passes. Accordingly, the S purge mode is stopped after the set time C passes since the occlusion-type NOx catalyst 25 cannot easily reach the optimum high temperature for the emission of the SOx when the vehicle is driven in a city area or the like with the acceleration and the deceleration being repeated. This limits the act of maintaining the rich air-fuel ratio and continuing to rise the temperature in the temperature range where the S regeneration efficiency is not good, thus preventing the deterioration of the fuel consumption.

According to the present embodiment, the activation temperature of the occlusion-type NOx catalyst 25 is between 250° C. and 350° C., the temperature suitable for the desorption of the occluded SOx is between 650° C. and 800° C., and the rising set temperature ZSTEMP is increased from 600° C. according to the S regeneration frequency. Each temperature however, may be determined appropriately according to the characteristics of the occlusion-type NOx catalyst 25, the engine mode and the exhaust gas temperature. The present invention is characterized by controlling the operation of the regeneration means according to the estimation frequency, and therefore, the temperature conditions do not have to be set for starting the operation of the regeneration means (temperature rising means). More specifically, the regeneration means may be operated regardless of the catalyst temperature in the case where the sulfur component is not purged due to a small estimation frequency. The temperature rising means of the present invention should not be restricted to the above-described embodiment, but it may be a two-stage injection means for injecting additional fuel in an expansion process or a direct injection means for directly injecting fuel into the exhaust pipe 21 at the upstream of the occlusion-type NOx catalyst 25. It is also possible to use heating means such electric heating catalyst as the temperature rising means. Under some driving conditions, the temperature rising means does not have to be operated if the temperature of the catalyst is already high, or the means for making the air-fuel ratio rich does not have to be operated if the air-fuel ratio is already rich.

Moreover, the S purge is performed in such a manner that the degree of regeneration for purging the SOx from the occlusion-type NOx catalyst 25 is maintained within a predetermined range. It is possible to additionally provide a conventional device for performing the S purge by estimating the amount of SOx occluded by the occlusion-type NOx catalyst 25. In this case, it is preferable to use the conventional device secondarily. For example, in view of the fuel consumption and the like, it is preferable to operate the conventional device for the purpose of regenerating the catalyst forcibly or according to the estimated results of the SOx amount only when the driver does not drive the vehicle in such a manner as to start the S purge control of the present invention. In the above-described embodiment, the engine 11 is the cylinder fuel injection type spark ignition serial gasoline engine, but the engine 11 may be a manifold fuel injection type lean burn engine or diesel engine on the condition that the engine 11 has the occlusion-type NOx catalyst.

As set forth hereinabove, the exhaust gas purifying apparatus of the internal combustion engine according to the present invention enables the stable regeneration of the catalyst device and prevents the deterioration of the exhaust gas characteristics caused by the deterioration of the catalyst device.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An exhaust gas purifying apparatus of an internal combustion engine comprising:
   a catalyst device provided in an exhaust passage of said internal combustion engine, said catalyst device occluding a sulfur component in exhaust gas when an exhaust gas air-fuel ratio is lean at least;
   regenerating means for increasing a temperature of said catalyst device to desorb said sulfur component from said catalyst device when the temperature of said catalyst device is not less than a set temperature that is determined within such a range that the occluded sulfur component can be desorbed;
   frequency estimating means for estimating a frequency, representative of the normalized duration of sulfur regeneration time per unit distance traveled, at which the occluded sulfur component is brought into the state of being emitted; and
   operation control means for controlling an operation of said regeneration means according to an output of said frequency estimating means.

2. An exhaust gas purifying apparatus of an internal combustion engine comprising:
   a catalyst device provided in an exhaust passage of said internal combustion engine, said catalyst device occluding a sulfur component in exhaust gas when an exhaust gas air-fuel ratio is lean at least;
   regenerating means for increasing a temperature of said catalyst device to desorb said sulfur component from said catalyst device when the temperature of said catalyst device is not less than a set temperature that is determined within such a range that the occluded sulfur component can be desorbed;
   frequency estimating means for estimating a frequency at which the occluded sulfur component is brought into the state of being emitted; and
   operation control means for controlling an operation of said regeneration means according to an output of said frequency estimating means;
   wherein said frequency estimating means has desorption frequency sensing means for calculating said frequency according to a regeneration period and a running distance of said catalyst device at a specific catalyst temperature at which said sulfur component can be desorbed.

3. An exhaust gas purifying apparatus of an internal combustion engine comprising:

a catalyst device provided in an exhaust passage of said internal combustion engine, said catalyst device occluding a sulfur component in exhaust gas when an exhaust gas air-fuel ratio is lean at least;

regenerating means for increasing a temperature of said catalyst device to desorb said sulfur component from said catalyst device when the temperature of said catalyst device is not less than a set temperature that is determined within such a range that the occluded sulfur component can be desorbed;

frequency estimating means for estimating a frequency at which the occluded sulfur component is brought into the state of being emitted;

operation control means for controlling an operation of said regeneration means according to an output of said frequency estimating means; and set temperature changing means for changing said set temperature according to the output of said frequency estimating means;

wherein said set temperature changing means increases said set temperature as said frequency increases.

4. An exhaust gas purifying apparatus of an internal combustion engine comprising:

a catalyst device provided in an exhaust passage of said internal combustion engine, said catalyst device occluding a sulfur component in exhaust gas when an exhaust gas air-fuel ratio is lean at least;

regenerating means for increasing a temperature of said catalyst device and making the air-fuel ratio rich to desorb said sulfur component from said catalyst device;

frequency estimating means for estimating a frequency, representative of the normalized duration of sulfur regeneration time per unit distance traveled, at which the occluded sulfur component is brought into the state of being emitted; and operation control means for controlling an operation of said regeneration means according to an output of said frequency estimating means.

5. An exhaust gas purifying apparatus of an internal combustion engine comprising:

a catalyst device provided in an exhaust passage of said internal combustion engine, said catalyst device occluding a sulfur component in exhaust gas when an exhaust gas air-fuel ratio is lean at least;

regenerating means for increasing a temperature of said catalyst device and making the air-fuel ratio rich to desorb said sulfur component from said catalyst device;

frequency estimating means for estimating a frequency, representative of sulfur regeneration time per unit distance traveled, at which the occluded sulfur component is brought into the state of being emitted; and operation control means for controlling an operation of said regeneration means according to an output of said frequency estimating means.

6. An exhaust gas purifying apparatus of an internal combustion engine comprising:

a catalyst device provided in an exhaust passage of said internal combustion engine, said catalyst device occluding a sulfur component in exhaust gas when an exhaust gas air-fuel ratio is lean at least;

regenerating means for increasing a temperature of said catalyst device to desorb said sulfur component from said catalyst device when the temperature of said catalyst device is not less than a set temperature that is determined within such a range that the occluded sulfur component can be desorbed;

frequency estimating means for estimating a frequency, representative of sulfur regeneration time per unit distance traveled, at which the occluded sulfur component is brought into the state of being emitted; and operation control means for controlling an operation of said regeneration means according to an output of said frequency estimating means.

7. An exhaust gas purifying apparatus of an internal combustion engine according to claim 6, wherein:

said regenerating means includes ignition timing control means for controlling an ignition timing to increase the temperature of catalyst, and air-fuel ratio control means for controlling an air-fuel ratio of said internal combustion engine; and when the temperature of said catalyst device is not less than said set temperature, said ignition timing control means retards the ignition timing and said air-fuel control means changes the air-fuel ratio in such a manner as to achieve an excessive concentration of fuel.

8. An exhaust gas purifying apparatus of an internal combustion engine according to claim 6, further comprising stop means for stopping the operation of said regeneration means if the temperature of said catalyst device does not reach an optimum catalyst temperature range for desorbing said sulfur component even though a predetermined period of time passes after the operation of said regeneration means.

9. An exhaust gas purifying apparatus of an internal combustion engine according to claim 6, wherein:

said frequency estimating means has desorption frequency means for calculating a regeneration period at a predetermined temperature of said catalyst device.

10. An exhaust gas purifying apparatus of an internal combustion engine according to claim 9, wherein:

said operation control means operates said regeneration means if an output of said frequency estimating means is small and the unoperated state of said regeneration means continues for a predetermined period of time.

11. An exhaust gas purifying apparatus of an internal combustion engine according to claim 9, further comprising:

set temperature changing means for changing said set temperature according to the output of said frequency estimating means.

12. An exhaust gas purifying apparatus of an internal combustion engine according to claim 11, further comprising:

a sensor provided in said exhaust passage in order to sense an exhaust gas temperature; and wherein said operation control means operates said regeneration means when the temperature of said catalyst device, which is estimated from an output of said sensor, exceeds said set temperature.

* * * * *